United States Patent [19]
Kostic et al.

[11] Patent Number: 5,751,704
[45] Date of Patent: May 12, 1998

[54] TECHNIQUE FOR MINIMIZING THE VARIANCE OF INTERFERENCE IN PACKETIZED INTERFERENCE-LIMITED WIRELESS COMMUNICATION SYSTEMS

[75] Inventors: Zoran Kostic; Gordana Pavlovic, both of Tinton Falls, N.J.

[73] Assignee: Lucent Technologies Inc., Murray Hill, N.J.

[21] Appl. No.: 609,582

[22] Filed: Mar. 1, 1996

[51] Int. Cl.$^6$ .............................. H04J 13/04; H04J 3/16
[52] U.S. Cl. .......................... 370/335; 370/336; 370/337; 370/320; 370/342
[58] Field of Search .......................... 370/335, 336, 370/337, 320, 342, 345, 347, 350, 478, 479; 375/202, 203, 206, 208, 209, 210

[56] References Cited

U.S. PATENT DOCUMENTS

| | | |
|---|---|---|
| 5,166,932 | 11/1992 | Hoff et al. |
| 5,341,397 | 8/1994 | Gudmundson ............ 370/335 |
| 5,404,355 | 4/1995 | Raith ........................ 370/336 |
| 5,459,728 | 10/1995 | Yoshioka et al. ......... 370/337 |
| 5,642,356 | 6/1997 | Wenk ......................... 370/337 |

FOREIGN PATENT DOCUMENTS

WO 95 32566 A 11/1995 WIPO.

OTHER PUBLICATIONS

European Search Report dated Jun. 26, 1997, regarding EPO Application No. EP 97301022.6.
IEEE Transactions on Communications, vol. 38, No. 6, Jun. 1990, New York, US, pp. 875–888, XP000148234, Alex W. Lam, Dilip V. Sarwate: "Time-Hopping and Frequency-Hopping Multiple-Access Packet Communications" * p. 875, left-hand column, line 1 -p. 876, left-hand column, line 40 ** p. 876, right-hand column, line 18 -line 44*.

IEEE Journal on Selected Areas in Communications, vol. 12, No. 4, May 1994, pp. 622–637, XP000588839, Ahmed K. Elhakeem, Rocco Di Girolamo, Ilyess B. Bdira, M. Talla: "Delay and Throughput Characteristics of TH, CDMA, TDMA, and Hybrid Networks for Multipath Faded Data Transmission Channels" * p. 622, right-hand column, line 9 –line 23*, * p. 625, right-hand column, line 3 –pp. 627, left-hand column, line 10*.

IEEE Transactions on Communications, vol. 42, No. 8, Aug. 1994 New York, US; pp. 2608–2617, XP000462373, Zoran Kostic, Edward L. Titlebaum; "The Design and Performance Analysis for Several New Classes of Code for Optical Synchronous CDMA and Arbitrary-Medium Time-Hopping Synchronous CDMA Communication Systems".

(List continued on next page.)

*Primary Examiner*—Wellington Chin
*Assistant Examiner*—Steven Nguyen
*Attorney, Agent, or Firm*—Samuel R. Williamson

[57] ABSTRACT

A technique for packet-switching suitable for interference-limited wireless communication systems is provided. Long bursty packets of data are broken into shorter units or packet-slots. This advantageously provides for averaging and minimizing interference in time—one of the requirements for achieving high system capacity in interference-limited systems. Transmit-start times and durations of packet slots are controlled by packet-slot distribution patterns. The patterns are representable by unipolar binary codes/sequences whose properties are based on number-theoretic principles. The technique minimizes the time variance of composite interference due to simultaneous transmissions of numerous signals over the same frequency channel. By minimizing the variance of overall interference, this technique satisfies the demand of multi-media traffic and also increases system capacity in a fading multipath environment.

16 Claims, 7 Drawing Sheets

OTHER PUBLICATIONS

IEEE Transactions on Communications, vol. 41, No. 8, Aug. 1993, New York, US, pp. 1217–1221, XP000393463; Svetislav V. Maric, Zoran I. Kostic, Edward L. Titlebaum; "A New Family of Optical Code Sequences for Use id Spread–Spectrum Fiber–Optic Local Area Networks".

Codierung Fur Quelle, Kanel Und Ubertragung, Vortrage Der Itg–Fachtagung, Munchen, Oct. 26–28, 1994, No. NR. 130, 26 Oct. 1994, Informationstechnische Gesellschaft IM VDE (ITG), pp. 331–338, XP000503808; KEMPF P: "A Multiple Access Scheme For Cellular Mobile Radio Similar To Code Time Division Multiple Access" p. 331, line 11 –p. 334, line 3.

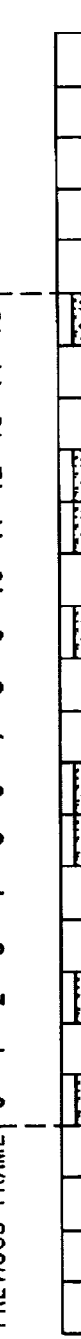
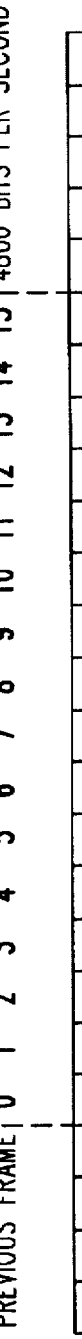
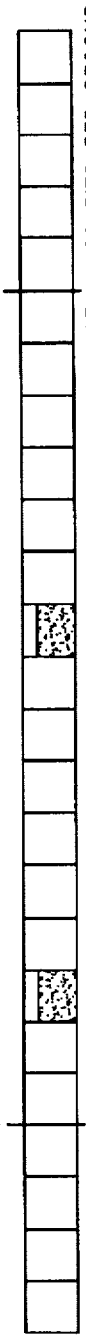
FIG. 2A PRIOR ART
FIG. 2B PRIOR ART
FIG. 2C PRIOR ART
FIG. 2D PRIOR ART

FIG. 3A MAPPING OF INTEGER SEQUENCES INTO UNIPOLAR BINARY SEQUENCES $y_{\alpha,\beta}(k) = (0,1,3,1,0)$ $s_{\alpha,\beta}(i) = (10000\ 01000\ 00010\ 01000\ 10000)$

FIG. 3C INTEGER SEQUENCES AND UNIPOLAR BINARY SEQUENCES FOR ASYNCHRONOUS CODES

| | $y_{\alpha,\beta}(k)$ | $s_{\alpha,\beta}(i)$ |
|---|---|---|
| $\alpha=0, \beta=0$ | (0,1,4,4,1) | (10000 01000 00001 00001 01000) |
| $\alpha=1, \beta=0$ | (1,4,4,1,0) | (01000 00001 00001 01000 10000) |
| $\alpha=0, \beta=1$ | (1,2,0,0,2) | (01000 00100 10000 10000 00100) |
| $\alpha=1, \beta=1$ | (2,0,0,2,1) | (00100 10000 10000 00100 01000) |

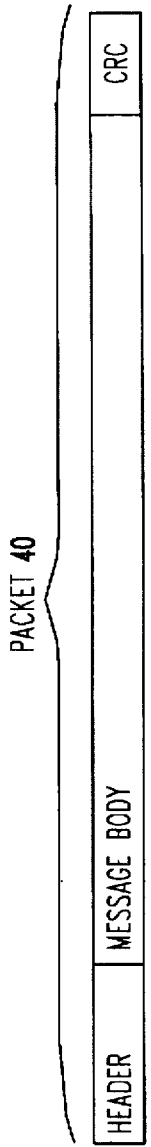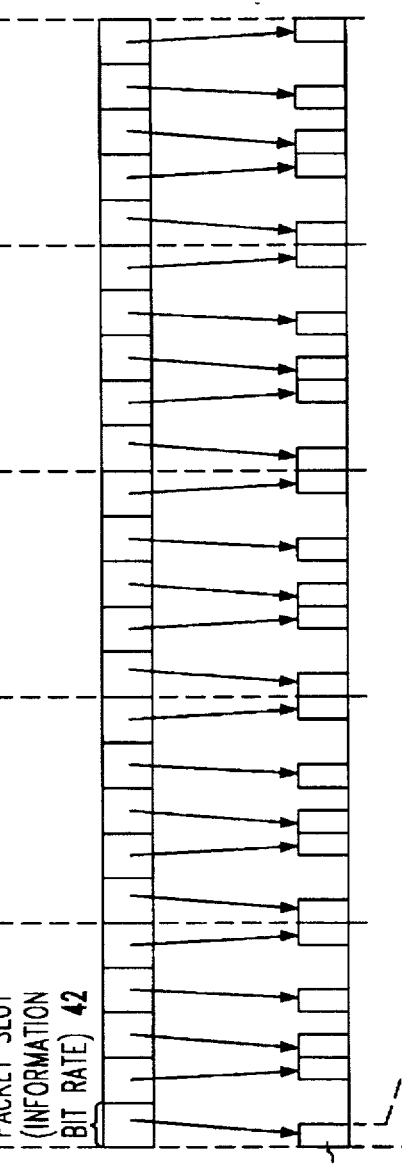

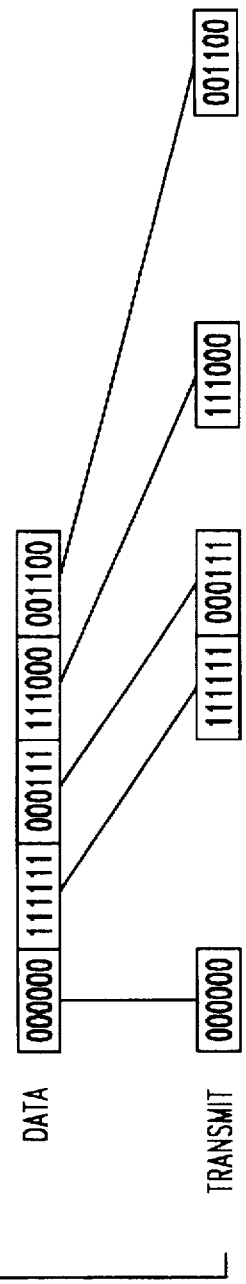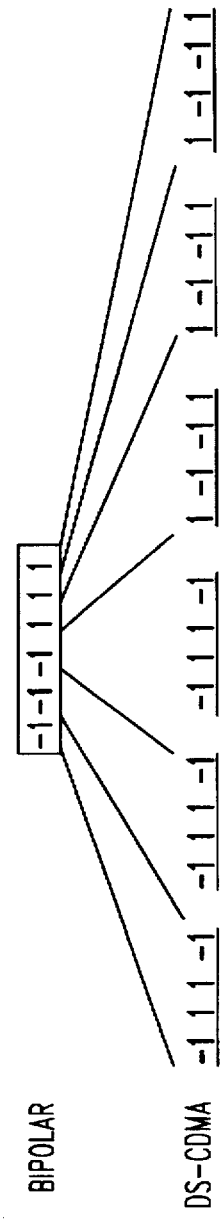
FIG. 5A
FIG. 5B
FIG. 5C
FIG. 5D
FIG. 5E
FIG. 5F

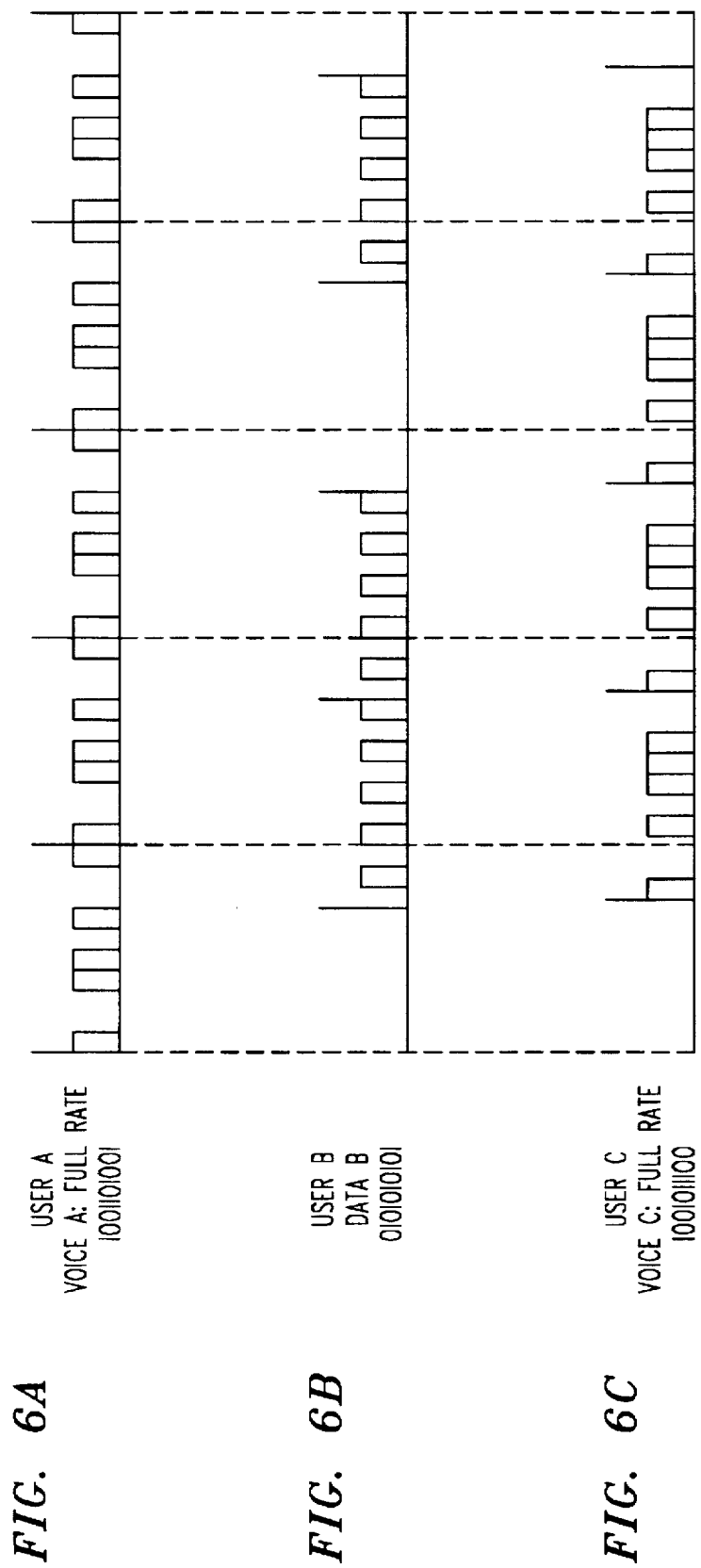

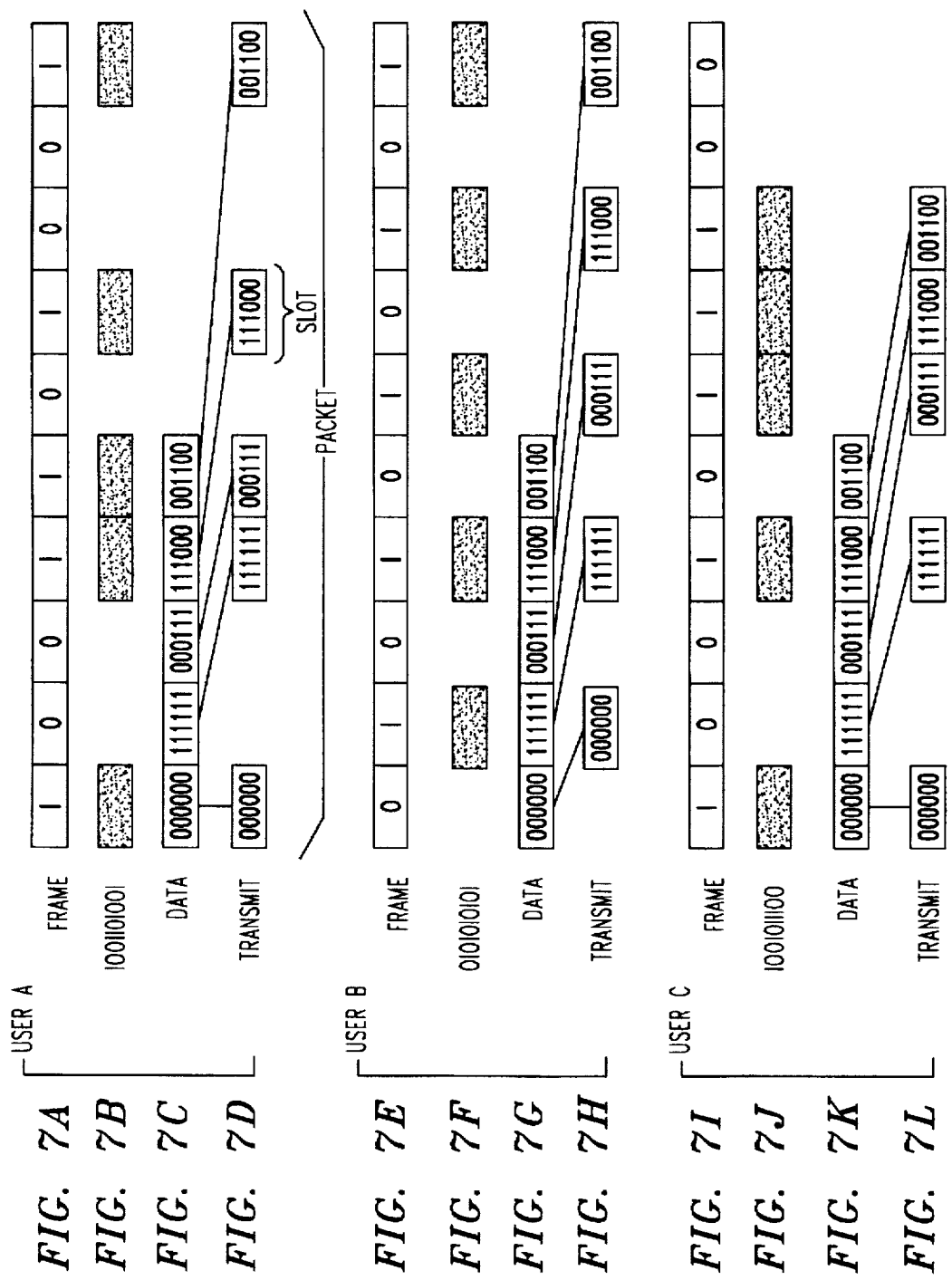

TECHNIQUE FOR MINIMIZING THE VARIANCE OF INTERFERENCE IN PACKETIZED INTERFERENCE-LIMITED WIRELESS COMMUNICATION SYSTEMS

BACKGROUND OF THE INVENTION

1. Technical Field

This invention relates to wireless communication systems and, more particularly, to a communication system wherein packet-based transmission of data of different statistics and variable bit rates are employed.

2. Description of the Prior Art

The emphasis on broadband multi-media communication needs of the future, exemplified by the boom in asynchronous transfer mode (ATM) network development, is putting further challenges in front of designers of wireless communication systems. It is expected that wireless systems, just as wired systems, should be able to handle broadband digital traffic obtained as a mixture of data from sources with different statistics and variable bit rates. Such requirements are in principle handled well with packet-switched systems.

To combat the destructive effects of fading multipath channels on signals in wireless communication systems, direct-sequence code-division multiple access (DS-CDMA) communication systems have been proposed and designed. Advantages of spread-spectrum signaling such as DS-CDMA in wireless systems have been heretofore described, for example, by M. K. Simon et al. in *Spread Spectrum communications* (3 vols.), Computer Sci. Press, 1985, and also by G. L. Turin in an article entitled "Introduction to Spread-Spectrum Antimultipath Techniques and Their Application to Urban Digital Radio," *Proceedings of the IEEE*, vol. 68, pages 328–358, March 1980, and K. S. Gilhousen, et al. in an article entitled "On the Capacity of a Cellular CDMA System," *IEEE Trans. Vehicular Technology*, May 1991.

Current practical CDMA systems are designed to address the speech-communication/low-bit-rate-data needs (in accordance with the Electronic Industries Association/ Telecommunications Industry Association/Interim Standard 95 (EIA/TIA/IS-95) *Mobile Station-Base Station Compatibility Standard for Dual-Mode Wideband Spread Spectrum Cellular System* dated March 1993), or bursty high-data-rate computer communication needs, but do not handle broadband multi-media traffic wherein data of different statistics and variable bit rates are combined. It is therefore desirable, particularly in applications involving multi-media traffic, to minimize a variance of interference which may be generally described as the changes in interference level with time and a number of users on a channel.

Conventional packet communication systems most often rely on bursty random access schemes which are unfortunately not compatible with the requirement to minimize the variance of interference in interference limited CDMA systems and thus cannot achieve maximum capacity in those systems. To maximize the overall system capacity in a CDMA system, it is required that total interference, i.e., transmissions from all various data sources, be minimal and equally distributed at all times. In EIA/TIA/IS-95, an example of how the variance of interference may be minimized across a time variable is provided. In this standard, the variance of interference is achieved through data randomization of power groups in the uplink direction. An illustration of this scheme is shown in FIG. 2. Although such scheme provides a means for minimizing a variance of interference, it is desirable to be able to satisfy the demands of multi-media traffic and to successfully combat multipath fading channels through utilization of a packet-based CDMA system.

SUMMARY OF THE INVENTION

In accordance with the invention, a technique for packet-switching suitable for interference-limited wireless communication systems is provided. In accordance with an aspect of the invention, long bursty packets of data are broken into shorter units or packet-slots. This advantageously provides for averaging and minimizing interference in time—one of the requirements for achieving high system capacity in interference-limited systems. The transmission of these shorter length packet-slots are scheduled according to rules obtained by using number theoretic principles in accordance with packet-slot distribution patterns. The demand of broadband multi-media traffic is easily accommodated through application of this technique.

BRIEF DESCRIPTION OF THE DRAWING

This invention and its mode of operation will be more clearly understood from the following detailed description when read with the appended drawing in which:

FIG. 2 depicts a data randomization pattern for interference minimization as used in the IS-95 Digital Cellular Standard;

FIG. 4 shows a packet, packet frame and packet slot as employed in CDMA modulation, in accordance with the invention;

FIG. 5 is a packet-slot distribution pattern of active packet-slots generated by a unipolar binary sequence, in accordance with the invention;

FIG. 6 is an illustrative example of the packet switching technique wherein two voice and one data channel are multiplexed, and wherein each channel uses a different packet-slot distribution pattern; and FIG. 7 is an illustrative example of the packet switching technique wherein three users are multiplexed, and wherein each user uses a different slot-distribution pattern.

Throughout the drawings, an element when shown in more than one figure is designated by the same reference numeral in each such figure.

DETAILED DESCRIPTION

Figure 1:
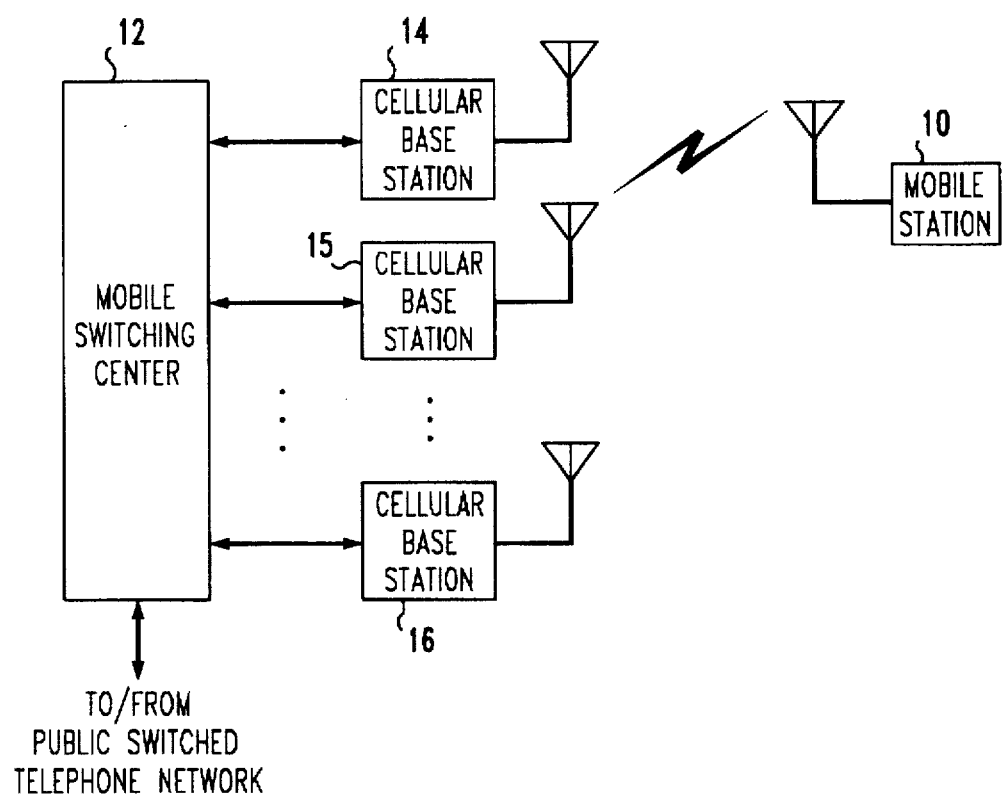
FIG. 1 shows a simplified block diagram of a cellular switching system, its logical entities as well as a relative connection with the public switched telephone network, this system being arranged for employing a packet switching technique, in accordance with the invention.

Referring now to FIG. 1, there is shown a simplified block diagram of a cellular switching system, its logical entities as well as its relative connection with the public switched telephone network. The cellular concept is well known and is described in general in the *Bell System Technical Journal*, Volume 58, Number 1, January 1979, and specifically in an article entitled *The Cellular Concept* by V. H. MacDonald, on pages 15 through 41 of this journal.

Illustratively included within the cellular switching system of FIG. 1 are a mobile station (MS) 10, a mobile switching center (MSC) 12 and cellular base stations (CBS)

14, 15 and 16. The MSC 12 illustratively switches a cellular telephone call for the MS 10 among cellular base stations 14, 15 and 16 as well as switches a telephone call between the MS 10 and a public switched telephone network (not shown) in a well known manner.

Referring next to FIG. 2, there is shown an arrangement employed in EIA/TIA/IS-95. This arrangement has a goal of equally distributing interference in time and is achieved by utilizing the so called power control groups. Data is sent only in some power groups (of 16 power groups available in a frame). Active power groups are dynamically determined based on selected bits of the long PN (pseudo-noise) sequence code.

Shown in FIGS. 3 through 7 and described in the text herein below, is a transmission technique which limits the variance of interference in an interference limited wireless communication system. Packets, packet frames, packet slots, CDMA modulation and packet-slot distribution patterns are illustratively described in accordance with the disclosed embodiment. For achieving the advantageous packetizing transmission technique, well known circuitry in both a cellular base station, such as base station 14, and also the mobile station 10, may be either configured with a microcomputer present therein or easily supplemented with one of readily available microcomputers from such suppliers as Signetics, Intel, Motorola and AMD and the proper coding then provided for the utilized microcomputer.

In describing the invention, some commonly used terms in the art and others used herein are now defined. A packet may be defined as a collection of information bits of length sufficient to carry some sensible amount of user data. Packets have overhead which can carry packet length, addresses of source and destination, routing information, data type information, and CRC and similar coding.

A packet-frame is a part of a frame. It represents a fixed time period within which a set of packet-slots is transmitted according to later herein described packet-slot distribution patterns. In accordance with an aspect of the invention, the selection of smaller segments (packet-slots) of one frame within which data is transmitted enables the advantageous operation of the packet switched technique. The notion of packet-frames is defined herein so that a time period of a fixed size can be used as a period for which packet-slot distribution patterns are defined. One user repetitively uses the same packet-slot distribution pattern from frame to frame.

A packet-slot may be defined as an elementary unit of a data packet. A packet is broken into N packet-slots having a fixed size. No overhead is associated with packet-slots when compared to packets. N packet-slots consist of exactly the same number of bits as their parent packet.

The packetized transmission technique provides: 1) service data sources of variable data transmission rates and statistics using packetized CDMA multiplex; 2) random user access to a radio channel using good correlation (or pseudo-orthogonal) properties of CDMA signals; and 3) maximum system capacity by minimizing interference due to all radio sources (CDMA systems are interference-limited).

For achieving an optimal CDMA system performance in interference limited systems, several requirements must be met. One critical requirement may be defined as follows: the transmission of signals on the radio channel needs to be such that it provides minimal and equally distributed interference in time, frequency and space. In accordance with the embodiment disclosed herein for use in a packet switching system, the requirement for equal distribution in time is met by pseudorandomization of transmission times of elementary data-carrying units which constitute packets i.e., packet-slots.

The pseudo-randomization of transmission times is achieved by breaking packets of various lengths into short, non-contiguous packet-slots of fixed lengths, according to packet-slot distribution patterns which are obtained by number theoretic techniques.

Figure 3B:
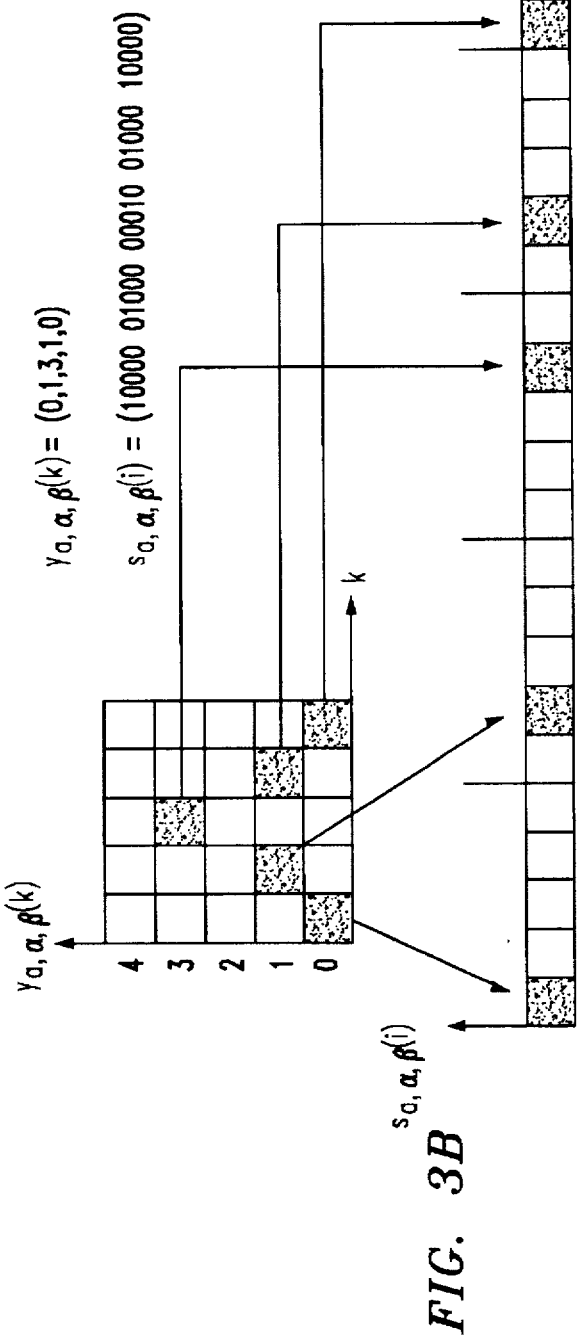
FIG. 3 shows a graphical representation of a sequence of integer numbers and a corresponding packet-slot distribution pattern for illustrating the packet switching technique, in accordance with the invention.

Referring next to FIG. 3, there is illustrated the process of designing packet-slot distribution patterns. First an integer sequence is designed using any one of the formulas described later herein. As shown in FIG. 3A, for example, the obtained integer sequence is (0,1,3,1,0). Selected desirable properties of sequences are obtained using this design. The next step in the process is mapping an integer sequence into a 0,1 unipolar binary sequence. This mapping is graphically illustrated in FIG. 3A and 3B, in combination. A 5-by-5 array of squares may represent an integer sequence, where the vertical location of a shaded square in the array signifies the value of the integer and the horizontal location of the shaded square signifies the order of an integer in the sequence of integers.

The properties of the integer sequence are used in obtaining a unipolar binary sequence. The next step in the process involves having each column of the 5-by-5 array rotated into a horizontal position and each one of the horizontally arranged columns are put in a sequence one after the other. This yields a one-dimensional or unipolar binary sequence comprising a linear array of 25 squares that are either shaded or unshaded in accordance with their original state in the 5-by-5 array. Next in the process, the shaded squares are assigned a value of 1 and unshaded squares are assigned a value of 0. As an example, a numerical representation of one sequence which corresponds to the obtained one-dimensional pattern (10000 01000 0010 01000 10000) is illustrated in FIGS. 3A and 3B, in combination. FIG. 3C shows an additional numerical representation of one full set of integer sequences generated in the same manner as that shown in FIGS. 3A and 3B but with different parameters.

Assuming that a sufficient bandwidth exists in an interference-limited wireless communication system to handle multiple users of different source data rates (including the CDMIA processing gain), 1) Users of this system transmit at a fixed channel transmission chip rate (in packet-slots when they do transmit), which is significantly higher than the information bit rate of the data source of the user; and 2) since individual users do not need to use the whole bandwidth of the channel, the users either respectively select time periods (packet-slots) in which their transmissions are to occur or a controller may be designated for generating and respectively allocating the time periods to the users. By doing either of the two, the users utilize the available channel rate with a duty cycle specific to their needs. One transmitter selects and uses one sequence for its packet-slot distribution pattern and each transmitter has a different pattern. The selection of packet-slot distribution patterns for transmission is based on unipolar binary codes with good correlation or pseudo-orthogonal properties.

Referring next to FIG. 4, there is shown a graphical illustration of a packet, packet frame and packet slot that may be employed in an interference-limited wireless communication system, in accordance with the disclosed embodiment. Each packet 40 contains information which needs to be sent over a packet network and may have a length that differs from other otherwise similar packets. For the purpose of utilizing the properties of the packet-slot distribution patterns described herein, a fixed number of bits is chosen to constitute a packet frame 41. This frame 41 is smaller than a normal packet length. Data is then further grouped into yet smaller sets or packet-slots 42. Since channel bandwidth is significantly larger than the rate of the information source, each of the packet-slots is compressed into a short amount of time, as reflected by the communication media rate 43. In between any two packet-slots originating from a single source, there can exist time where no data is transmitted from that source.

Each packet slot contains a certain number of symbols which are transmitted over the channel. In wireless applications, this is the set of +1,−1bits denoted by 44 in FIG. 4F. When the modulation employed is DS-CDMA, every bit is sent as a predetermined sequence of chips 1 and −1 denoted by 45 in FIG. 4F. Also, every user uses a different predetermined sequence.

FIG. 5, is a packet-slot distribution pattern of active packet-slots generated by a unipolar binary sequence. The packet frame 41 contains entries "I" and "O". The entry I denotes that data may be sent during the corresponding packet-slot and O denotes that no data may be sent during corresponding packet-slot. In FIG. 5B, for example, the I's are represented as shaded rectangles and those rectangles which correspond to the O's are not reproduced in this figure but rather are represented by empty spaces between the shaded rectangles. In FIG. 5C, all the data symbols that need to be sent during one frame are shown. FIG. 5D illustrates exactly when each of the symbols is sent, this being determined based on the slot-distribution pattern denoted by a sequence of I's and O's. In FIG. 5E data symbols are represented as +1 and −1 rather than 0 and 1. Finally, in FIG. 5F, every symbol individually is further represented by a particular predetermined sequence of +1 and −1 chips (in this example of length 4).

FIG. 6 shows how the packet-slots of different users are combined when these packet-slots are transmitted over a channel. A simple three user case (User A, User B and User C) is illustrated. Although it is desirable to avoid any overlap, some overlap is allowed between packet-slots of different users. Such overlap is allowed because of the fact that the underlying modulation technique is DS-CDMA which allows data to be extracted even though overlap occurs. Since each user uses a different packet-slot distribution pattern, in actual use such overlap is minimized by the automatic statistical multiplexing of data advantageously provided by the technique described herein.

FIG. 7 provides a more detailed representation of the packet switching technique as illustrated in FIG. 6. It is shown in this figure exactly when each of the information bits from each of the three active users is transmitted over the channel. The numerical representation of pattern distribution patterns for each of the users also is shown as a sequence of O's and I's.

For physical layer modulation of data that is transmitted in an interference limited wireless communication system, spread spectrum signaling is chosen in the form of DS-CDMA. This modulation ensures that no collisions occur which would cause data loss and require retransmission. A number of DS-CDMA signals originating from different users can coexist in the same time/bandwidth space. CDMA modulation is accomplished by BPSK or QPSK using PN-sequences $\alpha_{i,j}$. The waveform of a signal at a chip rate including the pulse-shaping is defined as $$o_i(t) = \sqrt{2P} \; b_i \sum_j a_{i,j} p_{T_c}(t - iT - lT_c)\cos(\omega_c t + \Phi), \quad (1)$$

where $T_c$ is the chip duration, $T=LT_c$ is the signaling interval, $\Phi$ is the random phase, $\omega_c$ is the carrier frequency, P is the signal power, L is the sequence length, $p_T$ is the rectangular pulse of duration $T_c$, $\alpha_{i,} \in \{-1, 1\}$ is the DS-CDMA sequence (bipolar binary), and $b_i \in \{-1, 1\}$ is the user data. DS-CDMA PN-sequences are chosen to have good correlation properties (for example, so called Gold sequences).

As earlier indicated herein, a packet-slot may be defined as an elementary unit of a data packet. All packet-slots which constitute a data packet travel through the network using the same routing, as if they were chained together with chains of different lengths. Each node in the network has to receive all packet-slots in a particular packet in order to be able to process, check the correctness of, or retransmit the packet. The raison d'etre of packet slots is to break the bursty nature of packets. Breaking the burstiness requires that the transmission units be made as short as possible with the largest possible time periods between transmissions. In bandwidth-sparse wireless environments, it is considered undesirable to shorten the length of packets (instead of creating packet-slots) since the overhead associated with short packets is prohibitively large. This position, however, does not hold in broadband communications over high bandwidth communication media. For broadband media, very short packets are acceptable. By way of example, such short packets (cells) are used in ATM systems.

Packets, e.g., packet-frames, are broken into packet-slots using packet-slot distribution patterns which are representable by unipolar binary codes s(k). The time-domain signal representing data of a full packet after breaking the packet into packet-slots is given by the convolutional-type expression $$O_i(t) = s(k) \times o_i\left( t - \left( k - \sum_{l=1}^{k} s(l) \right) T_s \right)$$

for $(k-1) \times T_s \leq k \times T_s$, $k=1, 2, \ldots, L,$     (2)

where $O_i(t)$ is packetized and modulated signal; s(k) is the packet-slot distribution pattern or unipolar binary code s(k) $\in \{0,1\}$; s(k) $\in \{C_{QC}, C'_{QC}, C_{QCA}\}$—described in the sequel; $T_s$=slot duration.

Packet-slot distribution patterns may be conveniently represented as unipolar binary (0,1) codes or sequences. The binary code 0 represents those time periods within a frame where data (packet-slots) are not transmitted, and the binary code 1 represents those time periods of a frame during which packet slots are transmitted. The packet-slot distribution pattern may occasionally be referred to as a time-hopping pattern which is similar to the packet-slot distribution pattern.

To obtain minimal interference in CDMA systems, unipolar binary sequences representing packet-slot distribution patterns are either 1) mutually orthogonal or pseudo-orthogonal (in fully synchronous systems), or 2) have good auto-correlation and cross-correlation properties (in asynchronous systems). In a fully synchronous system, two sequences are 1) orthogonal if their inner product is zero and 2) pseudo-orthogonal if their inner product is close to zero.

The design and properties of several sequence sets with "good" properties are next described. A first one of these is a synchronous case which includes a sequence design from sets $C_{QC}$ and $C'_{QC}$. Unipolar binary sequences for synchronous packetized CDMA systems are required to have good pseudo-orthogonal properties. A design based on quadratic congruences (QC), such as is described by M. R. Schroeder in Number Theory in *Science and Communication*, Berlin: Springer Verlag, 1986, and also by Z. Kostic and E. I. Titlebaum in "The Design and Performance Analysis for Several New Classes of Codes for Optical Synchronous CDMA and for Arbitrary-Medium Time-Hopping Synchronous CDMA Communication Systems," IEEE Trans. Communications, vol. COM-42, PP.595–604, May 1989, is shown in the following three steps:

Step 1: First construct a sequence $$y^{QC}_{a,\alpha,\beta}(k)$$

of integer numbers, elements of a finite field GF(p) over an odd prime p by using $$y^{QC}_{a,\alpha,\beta}(k) \equiv [a(k+\alpha)^2 + \beta] (\bmod\ p)$$

$$k=0, 1, \ldots, p-1; a\in\{1,2,\ldots,p-1\}; \alpha,\beta\in\{0, 1, \ldots, p-1\} \quad (3)$$

A sequence $$y^{QC}_{a,\alpha,\beta}(k)$$

has p elements, and by changing parameters a, $\alpha$, and $\beta$ $(p-1)\times p\times p = p^3-p^2$ different sequences in a set may be generated.

Step 2: Next construct a sequence $$s^{QC}_{a,\alpha,\beta}(i)$$

of binary numbers (0,1) based on the sequence $$y^{QC}_{a,\alpha,\beta}(k)$$

by using the mapping $$s^{QC}_{a,\alpha,\beta}(i) = \begin{cases} 1 & \text{if } fkp + y^{QC}_{a,\alpha,\beta}(k) = i; \\ & i = 0,1,\ldots,p^2-1; k = \left\lfloor \frac{i}{p} \right\rfloor \\ 0 & \text{else.} \end{cases} \quad (4)$$

Here [x] defines the floor function of x, i.e., the largest integer value smaller than the real-valued argument x. A sequence $$s^{QC}_{a,\alpha,\beta}(i)$$

has $p^2$ elements, and $p^3-p^2$ different sequences are constructed by changing parameters a, $\alpha$, and $\beta$. How integer sequences are mapped into unipolar binary sequences is shown in FIG. 3.

Step 3: For a=0, $p^2$ sequences $$s^{QC}_{a,\alpha,\beta}(i)$$

can be generated. Only p of those are distinctive. All distinct sequences $$s^{QC}_{a,\alpha,\beta}(i)$$

for a=0, 1, 2, . . . , p–1 and $\alpha,\beta$=0, 1, 2, . . . , p–1, are grouped to obtain a set $C'_{QC}$ (p) with $p^3-p^2+p$ different sequences.

By fixing parameter a, p–1 different subsets $C_{QC}$ (p) of set $C'_{QC}$ (p), may be designed, each subset having a smaller number of sequences but possessing better properties.

The pseudo-orthogonal properties of sets $C_{QC}$ and $C'_{QC}$ are next described. Of these properties, code sets $C'_{QC}$ (P) possess the inner product properties QC2 and QC3, whereas sets $C_{QC}$ (p) have properties QC1 and QC2. The inner product between two sequences is defined as $I_{s_1,s_2}=$ $$\sum_{l=0}^{L-1} [s_1(l) \times s_2(l)].$$

QC1:

$$\sum_{i=0}^{p^2-1} [s^{QC}_{a,\alpha_1,\beta_1}(i) \times s^{QC}_{a,\alpha_2,\beta_2}(i)] \leq 1,$$

for the same a and all the combinations of $\alpha_1$, $\beta_1$, $\alpha_2$, $\beta_2$ except when ($\alpha_1=\alpha_2$ and $\beta_1=\beta_2$).

QC2: When ($\alpha_1=\alpha_2$ and $\beta_1 32 \beta_2$) then $$\sum_{i=0}^{p^2-1} [s^{QC}_{a,\alpha_1,\beta_1}(i) \times s^{QC}_{a,\alpha_2,\beta_2}(i)] = p.$$

QC3:

$$\sum_{i=0}^{p^2-1} [s^{QC}_{a_1,\alpha_1,\beta_1}(i) \times s^{QC}_{a_2,\alpha_2,\beta_2}(i)] \leq 2,$$

for an arbitrary combination of $\alpha_1$, $\alpha_2$, $\alpha_1$, $\beta_1$, $\alpha_2$, $\beta_2$ except when ($\alpha_1=\alpha_2$ and $\alpha_1=\alpha_2$ and $\beta_1=\beta_2$) simultaneously.

In the context of packet-slot distribution patterns, the bound on the inner product between two patterns (unipolar binary sequences) represents the maximal number of packet-slots for which the data is sent from, say, two different users during the same time. The smaller this number, the better the performance (i.e., the smaller the interference is).

The design and properties of a second sequence set with "good" properties is next described. This second one of these is an asynchronous case which includes a sequence design from the set $C_{QCA}$.

Sequences which can be used effectively in asynchronous communications are a subset of sequences which are used in synchronous communications. They are required to have good correlation properties. Formal representation is somewhat different between the two sequencies, however.

A unipolar binary sequence $u_m$ (i), i=0, 1, 2, . . . , n–1, a member of an Asynchronous Quadratic Congruence Code $C_{QCA}$ is constructed by $$u_m(i) = \begin{cases} 1 & \text{if } fy_m(k) + kp = i, \\ & i = 0,1,\ldots,n-1; k = \left\lfloor \frac{i}{p} \right\rfloor \\ 0 & \text{else.} \end{cases} \quad (5)$$

where p is an odd prime and $n=p^2$. The quadratic congruence placement operator which generates integer sequence $y_m$ (k) is given by $y_m$ (k)$\equiv$a$k^2$+bk+c (mod p), where a is an index parameter within the family and b, c are arbitrary.

Sequence $u_m$ (i) can be used for design of QC based slot-distribution patterns for fully asynchronous communications.

The correlation properties of set $C_{QCA}$ are next described. A code C with parameters n>1, $1 \leq w \leq n$, $0 \leq \lambda_a, \lambda_c \leq w$ may be defined as a family of (0,1)-sequences of length n, with constant Hamming weight w and restricted values $\lambda_a$ and $\lambda_c$ of their out of phase auto-correlation and cross-correlation functions. Such codes are described, for example, by F. R. K. Chung et al. in "Optical Orthogonal Codes: Design, Analysis and Applications." *IEEE Trans. Information Theory*, vol. IT-35, pp. 595–604, May 1989.

Quadratic congruence asynchronous codes $C_{QCA}$ are ($p^2$, p, 2, 4) codes for an odd prime p as proven by S. V. Maric et al. in "A New Family of Optical Code Sequences for Use in Spread Spectrum Fiber-Optical Local Area Networks," *IEEE Trans. Communications*, vol. Com-41, pp. 1217–1222, August 1993.

In the worst case interference, for every prime p, there can be at most M=p–1 different users in the system. The number of ones in each code sequence is p and hence the maximum of the auto-correlation function is equal to p.

In the context of packet-slot distribution patterns the bounds on correlation between two patterns (unipolar binary sequences) represent the maximal number of packet-slots for which the data is sent from the two different users during the same time. In this asynchronous case, this bound is not violated for any arbitrary shift (phase) between the two patterns. The smaller the number, the better the performance in terms of interference.

The properties for the packet-slot distribution patterns discussed herein may be summarized thusly. 1) The properties in terms of either pseudo-orthogonality (synchronous case) or auto-correlation and cross-correlation (asynchronous case) are the best available for the number of sequences available in the sequence set. It should be noted that well known bipolar sequences with good correlation properties do not trivially map into unipolar binary sequences with good correlations. 2) The design of the distribution patterns is based on simple modular arithmetic, and thus it is easy to exchange the sequence index between a transmitter and a receiver. 3) The use of the described packet-slot distribution patterns provides automatic statistical multiplexing of data from numerous transmitters. 4) Minimal variation of interference with time guaranties the best possible capacity for considered interference-limited systems.

The sequence design steps presented herein above permits computation of exact expressions for probability distribution functions (PDFs) representing overlaps between packet-slots of two or more users. Such was proven by Z. Kostic et al. in "Cyclical Coincidence Arrays: Derivation of New Properties of Signature Sequences and Interference Computation for Some CDMA communication Systems," in *Proceedings of the 26th Annual Conference on Information Sciences and Systems*, (Princeton, N.J.), pp. 1073–1077, March 1992.

These PDFs represent the PDFs of interference at a packet-slot resolution level. It is to be noted that even the overlap of two packet-slots does not necessarily mean the loss of data since underlying DS-CDMA modulation still allows for coexistence of signals in the same bandwidth and time. Still, the smaller the number of packet-slot overlaps, the smaller the actual interference is in the system. Since packet-slots are distributed in time in a random fashion, the variance of interference is minimized across the time axis. Proofs which confirm the computability of exact probability distribution functions are shown in *Proceedings of the 26th Annual Conference on Information Sciences and Systems*, (Princeton, N.J.), pp. 1073–1077, March 1992.

In a design example, there are described approximate source bit rates and chip transmission rates for two types of users in a packet-based wireless communication system for multimedia. In the design example, their relationships are also described. In addition, certain technological challenges which had to be met in order to implement this system are also described.

High bit rate video sources defined by the MPEG-2 (motion pictures expert group) standard as well as high definition television (HDTV) require on the order of 6 [Mbits/second]. With a non-verified assumption that CDMA processing gain (symbol-rate/chip-rate ratio) of 10 is sufficient, the chip rate is around 60 [Mchips/second]. The packet-frame period is chosen to be 20[ms] so that its duration is the same as the delay of the most often used CELP (code excited linear prediction) speech coders. In 20 milliseconds there are 120,000 bits and 1,200,000 chips. For this design example, this high-bit rate user is allowed to transmit continuously throughout the frame. This is the same as saying that the packet slot distribution pattern consists of all ones. Since the underlying modulation technique is DS-CDMA, several other high bit rate users may also transmit over the same bandwidth and time (the exact number depends on the processing gain).

Lower bit rate users are chosen to have rates equivalent to 2D channels of ISDN (128[Kb/second]). In 20 milliseconds there are 2,560 bits. It is assumed that as many as 63 users may utilize the system. According to the asynchronous packet-slot distribution patterns described herein, this implies that there must be 63**2=3,969 time periods in a frame within which a packet-slot can be transmitted. One packet-slot of data consists of 2;560/63=40.63 bits. The rate of bit-transmission through the channel is 63*128[Kb/sec] =8.064 [Mbits/second]. Utilizing the chip rate of 60[Mchip/second], the processing gain for ISDN users may be computed to be around 60/8=7.5. These numbers are only approximate, however. It is necessary to match prime number arithmetics with numbers of bits per packet-slot and frame, as well as the process gain.

Since some interference generated by high-bit rate users will be always present in this system, interference caused by ISDN-rate users is advantageously minimized utilizing the technique disclosed herein.

Various other modifications of this invention are contemplated and may obviously be resorted to by those skilled in the art without departing from the spirit and scope of the invention as hereinafter defined by the appended claims.

What is claimed is:

1. A method of switching packets in a wireless communication system, the method comprising the steps of:

separating packets into short packet-slots without overhead;

determining packet slot distribution patterns by a number-theoretic basis, wherein said number theoretic-basis includes properties of unipolar binary sequences;

transmitting said packet-slots at times determined by said packet-slot distribution patterns; and generating a time domain signal representing data of said slot distribution pattern, said time domain signal being selected in accordance with the following formula:

$$O_i(t) = s(k) \times o_i\left(t - \left(k - \sum_{l=1}^{k} s(l)\right) T_S\right)$$

for $(k-1) \times T_S \leq t \leq k \times T_S$, $k=1, 2, \ldots, L$, where $O_i(t)$ is the packetized and modulated signal;

s(k) is the packet-slot distribution pattern or unipolar binary code s(k) $\in \{0, 1\}$;

$o_i(t)$ is the waveform of the time-domain signal for a single packet-slot;

t is time;

s(k) ∈ {$C_{QC}$, $C'_{QC}$, $C_{QCA}$}—described in the sequel;

k is the packet-slot index; and $T_S$=slot duration.

2. The method of claim 1 wherein said wireless communication system is a synchronous packetized system and said determining step further includes the step of selecting unipolar binary sequences for use in said synchronous packetized system.

3. The method of claim 1 wherein said binary sequences are selected in accordance with the following formula wherein a sequence $$y^{QC}_{a,\alpha,\beta}(k)$$

of integer numbers, elements of a finite field GF (p) over an odd prime p, is constructed by using said formula:

$$y^{QC}_{a,\alpha,\beta}(k) \equiv [a(k+\alpha)^2 + \beta](\bmod\ p)$$

k=0, 1, ... ,p−1; α∈{1, 2, ... ,p−1}; α,β∈{0, 1, ... ,p−1} said sequence $$y^{QC}_{a,\alpha,\beta}(k)$$

having p elements; and changing parameters a, α, and β, to generate (p−1)×p× p=$p^3-p^2$ different sequences in a set.

4. The method of claim 3 wherein the sequence $$s^{QC}_{a,\alpha,\beta}(i)$$

of binary numbers (0, 1) based on the sequence $$y^{QC}_{a,\alpha,\beta}(k)$$

is constructed by using mapping in accordance with the following formula:

$$s^{QC}_{a,\alpha,\beta}(i) = \begin{cases} 1 & \text{if } fkp + y^{QC}_{a,\alpha,\beta}(k) = i; \\ & i = 0,1,\ldots,p^2-1; k = \left\lfloor \dfrac{i}{p} \right\rfloor \\ 0 & \text{else.} \end{cases}$$

where

[x] defines the floor function of x, i.e., the largest integer value smaller than the real-valued argument x; and sequence $$s^{QC}_{a,\alpha,\beta}(i)$$

has $p^2$ elements, and $p^3-p^2$ different sequences are constructed by changing parameters a, α, and β.

5. The method of claim 4 further including the step of grouping all distinct sequences $$s^{QC}_{a,\alpha,\beta}(i)$$

for a=0, 1, 2, ... ,p−1 and α,β=0, 1, 2, ... ,p−1, for obtaining a set $C'_{QC}$ (p) of size $p^3-p^2+p$.

6. The method of claim 1 wherein said wireless communication system is an asynchronous packetized system and said determining step further includes the step of selecting unipolar binary sequences for use in said asynchronous packetized system.

7. The method of claim 6 wherein the binary sequences are selected in accordance with the following formula:

$$u_m(i) = \begin{cases} 1 & \text{if } fy_m(k) + kp = i, \\ & i = 0,1,\ldots,n-1; k = \left\lfloor \dfrac{i}{p} \right\rfloor \\ 0 & \text{else.} \end{cases}$$

where $u_m$ (i), i=0, 1, 2, ... ,n−1, is a unipolar binary sequence and member of an asynchronous quadratic congruence code $C_{QCA}$; p is an odd prime and n=$p^2$; the quadratic congruence placement operator which generates integer sequence $y_m$ (k) is given by $y_m$ (k)≡$ak^2+bk+c$ (mod p), and where a is an index parameter within the family and b, c are arbitrary.

8. The method of claim 7 further including the step of providing automatic statistical multiplexing of data from multiple transmitters commonly operating on a channel in said wireless communication system.

9. In a wireless communication system, a packet switching arrangement comprising:

means for separating packets into short packet-slots without overhead;

means for determining packet slot distribution patterns by a number-theoretic basis, wherein said number theoretic-basis includes properties of unipolar binary sequences;

means for transmitting said packet-slots at times determined by said packet-slot distribution patterns; and means for generating a time domain signal representing data of said slot distribution pattern, said time domain signal being selected in accordance with the following formula:

$$O_i(t) = s(k) \times o_i\left(t - \left(k - \sum_{l=1}^{k} s(l)\right) T_S\right)$$

for (k−1)×$T_S \leq t \leq k \times T_S$, k=1, 2, ... , L,
where $O_i(t)$ is the packetized and modulated signal;

s(k) is the packet-slot distribution pattern or unipolar binary code s(k) ∈ {0, 1};

$o_i(t)$ is the waveform of the time-domain signal for a single packet-slot;

t is time;

s(k) ∈ {$C_{QC}$, $C'_{QC}$, $C_{QCA}$}—described in the sequel;

k is the packet-slot index; and $T_S$=slot duration.

10. The communication system of claim 9 wherein said wireless communication system is a synchronous packetized system and said determining means further includes means for selecting unipolar binary sequences for use in said synchronous packetized system.

11. The communication system of claim 10 wherein said binary sequences are selected in accordance with the following formula wherein a sequence $$y^{QC}_{a,\alpha,\beta}(k)$$

of integer numbers, elements of a finite field GF (p) over an odd prime p, is constructed by using said formula:

$$y^{QC}_{a,\alpha,\beta}(k) \equiv [a(k+\alpha)^2 + \beta](\bmod\ p)$$

k=0, 1, ... ,p−1; α∈{1, 2, ... ,p−1}; α,β∈{0, 1, ... ,p−1} said sequence $$y^{QC}_{\alpha,\alpha,\beta}(k)$$

having p elements; and further including means for changing parameters a, α, and β, to generate $(p-1) \times p \times p = p^3 - p^2$ different sequences in a set.

12. The communication system of claim 11 wherein the sequence $$s^{QC}_{\alpha,\alpha,\beta}(i)$$

of binary numbers (0, 1) based on the sequence $$y^{QC}_{\alpha,\alpha,\beta}(k)$$

is constructed by using mapping in accordance with the following formula:

$$s^{QC}_{\alpha,\alpha,\beta}(i) = \begin{cases} 1 & \text{if } fkp + y^{QC}_{\alpha,\alpha,\beta}(k) = i; \\ & i = 0,1,\ldots,p^2-1; k = \left\lfloor \frac{i}{p} \right\rfloor \\ 0 & \text{else.} \end{cases}$$

where

⌊x⌋ defines the floor function of x, i.e., the largest integer value smaller than the real-valued argument x; and sequence $$s^{QC}_{\alpha,\alpha,\beta}(i)$$

has $p^2$ elements, and $p^3 - p^2$ different sequences are constructed by changing parameters a, α, and β.

13. The communication system of claim 12 further including means for grouping all distinct sequences $$s^{QC}_{\alpha,\alpha,\beta}(i)$$

for a=0, 1, 2, ..., p−1 and α,β=0, 1, 2, ..., p−1, for obtaining a set $C_{QC}$ (p) of size $p^3 - p^2 + p$.

14. The communication system of claim 9 wherein said wireless communication system is an asynchronous packetized system and said determining means further includes means for selecting unipolar binary sequences for use in said asynchronous packetized system.

15. The communication system of claim 14 wherein the binary sequences are selected in accordance with the following formula:

$$u_m(i) = \begin{cases} 1 & \text{if } fy_m(k) + kp = i, \\ & i = 0,1,\ldots,n-1; k = \left\lfloor \frac{i}{p} \right\rfloor \\ 0 & \text{else.} \end{cases}$$

where $u_m$ (i), i=0, 1, 2, ..., n−1, is a unipolar binary sequence and member of an asynchronous quadratic congruence code $C_{QCA}$; p is an odd prime and $n=p^2$; the quadratic congruence placement operator which generates integer sequence $y_m$ (k) is given by $y_m(k) \equiv ak^2 + bk + c$ (mod p), and where a is an index parameter within the family and b, c are arbitrary.

16. The communication system of claim 15 further including means for providing automatic statistical multiplexing of data from multiple transmitters commonly operating on a channel in said wireless communication system.

* * * * *